(12) United States Patent
Fischer

(10) Patent No.: US 6,912,572 B1
(45) Date of Patent: Jun. 28, 2005

(54) SERVER MONITORING

(75) Inventor: David Fischer, Bern (CH)

(73) Assignee: SysControl AG (CH)

( * ) Notice: Subject to any disclaimer, the term of this patent is extended or adjusted under 35 U.S.C. 154(b) by 735 days.

(21) Appl. No.: 09/614,305

(22) Filed: Jul. 12, 2000

(30) Foreign Application Priority Data

Jun. 20, 2000 (CH) .............................................. 1222/00

(51) Int. Cl.⁷ .......................................... G06F 15/173
(52) U.S. Cl. ....................................... 709/224; 709/217
(58) Field of Search ................................ 709/224, 217, 709/218, 219, 203

(56) References Cited

U.S. PATENT DOCUMENTS

| | | | |
|---|---|---|---|
| 5,423,042 A | 6/1995 | Jalili | 709/328 |
| 5,880,740 A * | 3/1999 | Halliday et al. | 345/629 |
| 5,974,549 A * | 10/1999 | Golan | 713/200 |
| 6,006,260 A | 12/1999 | Barrick | 709/224 |
| 6,073,119 A * | 6/2000 | Bornemisza-Wahr et al. | 705/42 |
| 6,233,341 B1 * | 5/2001 | Riggins | 380/277 |
| 6,397,256 B1 * | 5/2002 | Chan et al. | 709/229 |
| 6,397,384 B1 * | 5/2002 | Briggs | 717/165 |
| 6,405,366 B1 * | 6/2002 | Lorenz et al. | 717/107 |
| 6,421,706 B1 * | 7/2002 | McNeill et al. | 709/204 |
| 6,453,320 B1 * | 9/2002 | Kukura et al. | 707/103 R |
| 6,484,276 B1 * | 11/2002 | Singh et al. | 714/41 |
| 6,529,784 B1 * | 3/2003 | Cantos et al. | 700/79 |
| 6,611,872 B1 * | 8/2003 | McCanne | 709/238 |

* cited by examiner

Primary Examiner—Mehmet B. Geckil
(74) Attorney, Agent, or Firm—Oppedahl & Larson LLP

(57) ABSTRACT

The invention concerns a method for causing a plugin to be executed, in particular for test purposes, on one or on several computers. The plugin is transmitted to at least one computer (11.1, 11.2, 11.3) through a network (2). Subsequently the plugin causes the at least one computer (11.1, 11.2, 11.3) to execute it.

7 Claims, 1 Drawing Sheet

SERVER MONITORING

Figure 1:
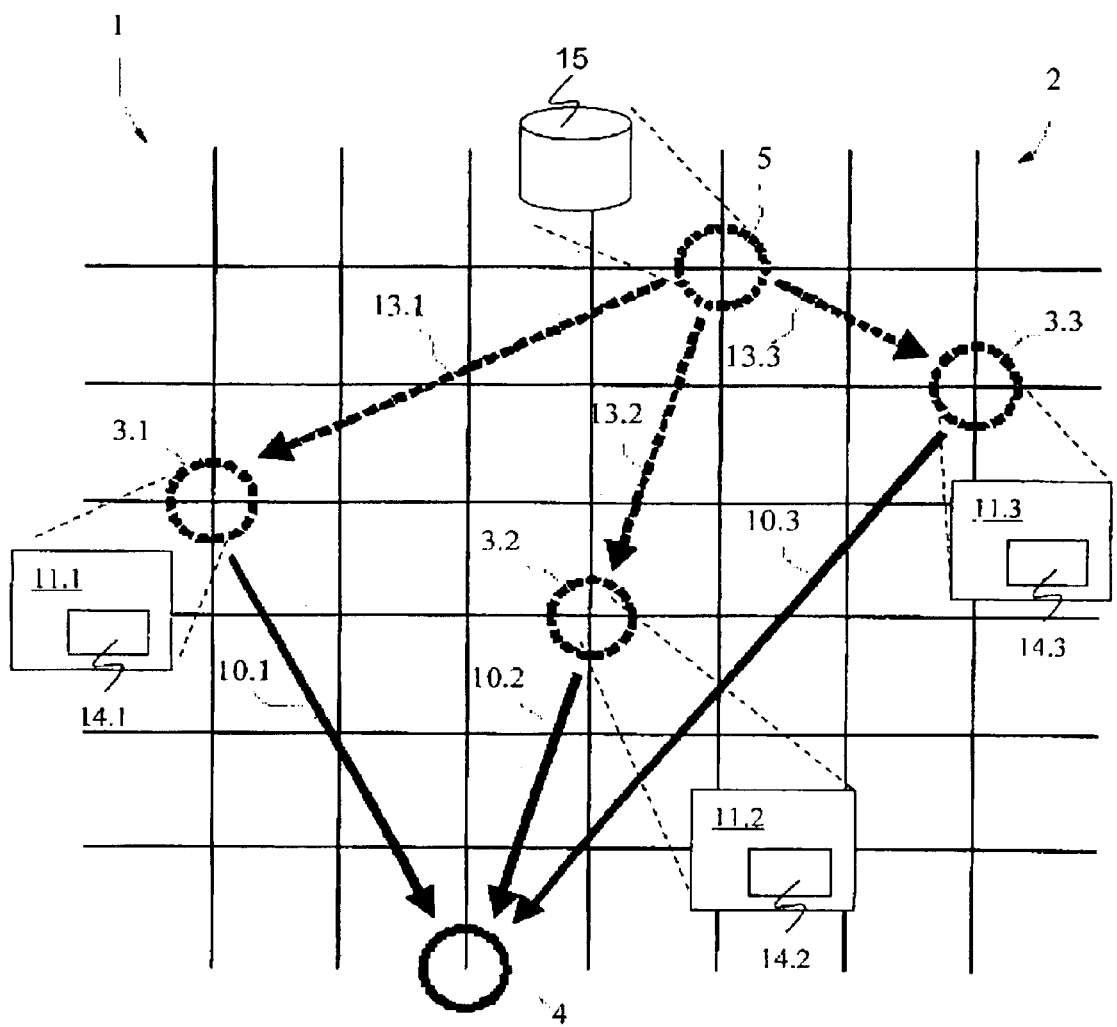

The invention presented her lies in the field of network —, resp., Internet technology. The object is achieved by the invention defined in the claims.

At the present time, in particular the Internet has become established as a world-wide means of communication. The quality of the services offered for this reason plays an essential role. Companies, which offer their services on the Internet, have a great interest, that their servers operate impeccably and that any unauthorized access is detected at an early stage and that measures can be implemented. A monitoring of these services is not known up until this moment. For this reason, many services offered on the Internet are not—or else only insufficiently taken advantage of. The services frequently manifest an unsatisfactory quality (too long response times, etc.), which prevents the potential users from making use of them. Cases of unauthorized access and changes are as a rule only detected very poorly and with some time delay. This leads to the consequence, that harmful software, such as viruses, etc., can spread undetected over longer periods of time. Worldwide damage to the tune of billions is not a rarity.

It is the object of the invention presented here to demonstrate a method for the execution of plugins; in particular for the monitoring of networks, Internet services and servers.

The idea of the invention divulged here is, i.a., based on utilizing a proxy-server support of the internet HTTP— protocol for the purpose of the automatic recording and the subsequent automatic playback of data traffic from one or from several HTTP clients (e.g., web—browsers), which are communicating with an HTTP—server or HTTP—proxy-server. In doing so, data, in preference referentially recorded, are stored in a form, which makes it possible to automatically and as many times as required repeat, monitor and evaluate the complete data traffic, which is generated by the client and by the server (requests) at a later point in time, which can be defined, this in particular from different geographical locations and under adherence to defined criteria. The process as a rule takes place without any active involvement of the original, generating client. During the recording of the data traffic, usually also the response data of the server (responses) are recorded in whole or in part. As a result of this, it is possible for the first time, that in case of a later utilization of the recorded client requests it can be checked, whether the server is providing analogous, unchanged data, or whether it deviates from a defined standard. This plays a relevant role for the periodic monitoring of cases of unauthorized access.

In connection with the monitoring, e.g., of viruses, in case of need, instead of an in most instances unsuccessful search for harmful programs, the information is periodically compared with secure and trustworthy reference data (from one or from several remote locations). A corresponding comparison provides meaningful data with a minimum required effort. Thus it is possible, e.g., that a company offers corresponding services in that it periodically monitors reference data from individual servers and compares these with their current behaviour, e.g. for the purpose of quality assurance. If so required, the response times of the server are recorded. The monitoring advantageously takes place from different geographical locations in such a manner, that a monitoring is carried out through several channels. With this, it is possible in addition to compare the performance and its deviations from definable limit values (in particular through differing routes) and to evaluate these. Corresponding alarm messages are issued if necessary.

The contents of the data traffic via a selected protocol (for example HTTP) plays a rather subordinate role in the case of the method described here, i.e., all contents can be recorded and played back again, even if these contents concern, e.g., contents of superordinate protocols, such as, e.g., JavaScript or SSL. Further examples of the method described here, e.g., are the recording of interactive web browser surfing sessions. In doing so, it is advantageous to generate a reference session out of one or out of several sessions. An evaluation and a subsequent utilization of these surfing sessions, e.g., in the form of load test routines serves for the referential monitoring and checking of cases of unauthorized access, as well as for measuring the performance. Monitored in particular is also the availability of the server, in order to monitor hardware defects or crashes. A comparison of the referenced (recorded) server response data with the data traffic generated on a server during a utilization of it, in particular through several channels or routes, is in preference utilized as a mechanism for the detection of modifications of the data content of the server as well as for the performance measurement in function of the location. Cases of illegal access and changes are therefore reliably and rapidly detected.

Normally the purposes of use of proxy-servers foreseen in the, e.g., at the present time very widespread HTTP— protocol are the following: temporary storage of data for the purpose of making the response times shorter; recording and evaluation of the data traffic between client and server, with a view to checking the surfing behaviour of individual natural persons (observation and checking of the person, suppression of undesirable websites, etc.); the prevention of the direct connection with the internet of individual computers of final users for security purposes. The invention divulged here is in a remote manner based on the functionality of a proxy-server. In doing so, in contrast to this the actual principal function of a conventional proxy-server is not made use of or if at all only in a secondary manner. The invention divulged here, i.a., manifests the following differences from a conventional proxy-server:

In order for it to be possible for all data contents between client and server to be recorded in a compact manner (timewise), in the case of the invention all cache mechanisms (both of the normal HTTP—protocol as well as of the HTTP—proxy—protocol, in particular of the those directly represented and of the references carried out by the client) are disregarded (if so required, a utilization can be foreseen) or suppressed. For this reason, the invention as a rule does not require its own cache.

In particular, specifically all information of the client to the server and of the server to the client is suppressed through cache possibilities, in order to achieve that all relevant data are transmitted.

The invention has means for recording. With interfaces specifically foreseen for this purpose these means are controlled. ("Start Record"). In this condition, all requests/responses are stored in a defined data structure in such a manner, that their course at a later point in time can be reconstructed with corresponding means (for example, a correspondingly programmed machine). The, e.g., referentially recorded data are advantageously stored in a corresponding library.

From the recorded data, when so required plugins in accordance with the invention are generated automatically or manually (in this context refer to the text further below), which can be implemented through means in accordance with the invention, e.g., probes (in this context refer to the text further below), in such a manner, that in particular the same test can be carried out simultaneously from differing locations. With this, it is possible to monitor a server with different reference data or several servers with special reference data. The invention can be utilized specifically for one client or else for all clients. In the case of clients with separate recording, advantageously an HTTP—authentication is demanded of the client. This then in case of every request of a client subsequently can be utilized to individually manage the recording data of the individual clients.

It goes without saying, that the invention if so required can also support HTTP to HTTPS (SSL) conversions, resp., superordinate protocols. For example, it is possible for the client to make unencrypted requests to the server for recording HTTPS enquiries. These unencrypted requests are only then encrypted by the invention and transmitted to the server. The response is once again decrypted by the invention and transmitted back to the client. In doing so, it is particularly advantageous, that the SSL—protocol is decoded by the invention and not only by the client. As a result, it is possible to record the data exchange between client and server also in case of an encryption. Superordinate protocols for the purpose of the recording/monitoring are specifically broken up, in that instead of a foreseen tunnelling process a client-server-client-server process is foreseen.

Plugins are known from prior art. Plugins typically are universally utilizable programs, which are specialized in the execution of any function. In order to activate a plugin, a corresponding plugin interface is required. In the case of Java programs, for example, this takes place through a corresponding interface. As a rule it is the case, that a plugin is loaded on the basis of a request, resp., of a requirement of a program (e.g., of a web browser). Both in the case of CORBA as well as of RMI (Java Remote Method Invocation), however, in contrast to the invention divulged here, only data, resp., variables are exchanged, no program code, however, is transmitted. In the case of the plugins in accordance with the invention, in contrast to prior art typically the program code is transmitted. In the case of conventional plugins, in addition the incentive for loading a plugin always originates from the location, at which the plugin is also executed (from inside). In the case of plugins in accordance with the invention, however, this incentive comes from a different location, typically therefore from outside.

The plugins in accordance with the invention advantageously function as follows: At a first location (point of origin) at a certain point in time it is ordered, that a plugin is to be executed at a second location (destination) by means of a suitable means. The plugin thereupon is transmitted to the second location (destination) together with a request for execution. The result therefore consists of the fact, that at the second location (destination) a plugin is executed, which, e.g., transmits a result back to the first location (point of origin). The only requirement at the second location (destination) is, that plugins in accordance with the invention can be received, resp., can be executed (=,,start-up,,). It is not a requirement, that the destination knows anything about the contents of the plugin in accordance with the invention. For security reasons, however, a plugin in accordance with the invention can be subject to certain limitations, which can be visible or invisible from the outside. Thus, e.g., it can be defined, that a plugin in accordance with the invention must not exceed a certain time of execution, etc. If a violation of a respective limitation is recorded, then corresponding measures are undertaken, in that, for example, the execution is aborted (i.e., the plugin is ,,killed,,). In the case of the implementation of plugins in accordance with the invention, for example, by means of the ,,Java,, programming language, at the destination by means of a special class loader ,,under order,, certain plugins are loaded as "Class". Subsequently an ,,instance,, of it is generated, which is then, e.g., called up through a plugin interface.

The plugins in accordance with the invention as a rule are automatically generated by means of an arrangement in accordance with the invention. In doing so, as a rule interactively generated data, e.g., from surfing sessions, are utilized. In the case of the generated plugins, these are typically executable program code. An essential difference to prior art consists, i.a., in the fact, that the plugins in accordance with the invention as a rule are automatically generated. A recorder in accordance with the invention, which, i.a., serves for the generation of plugins, advantageously has a web interface in such a manner, that even a technically not well versed user, e.g., can record a surfing session, in order to subsequently introduce it into the central data bank of test arrangements, resp., to establish it as a plugin. This surfing session from that moment on is available for carrying out tests of any kind at periodic or arbitrary time intervals by, e.g., probes. This deliberate end-user functionality, which is conceived in such a manner, that it can be operated without technical knowledge, provides additional advantages.

The invention is explained in more detail on the basis of the following FIGURE. This FIGURE schematically illustrates a network with probes and a central service.

FIG. 1 shows an advantageous embodiment of the invention. A monitoring system 1 in accordance with the invention through a network (inter-/intranet)2, if so required from different points 3.1, 3.2, 3.3, monitors any services on a host 4 with the help of a central service, which in preference is operated by means of a central system 5. Test configurations, test programs, for example in the form of plugins in accordance with the invention, and also test results are in preference stored in a data bank 15, which here is situated in the region of the central system 5. On the central system 5 a program is running, which periodically and/or aperiodically, executes predefined or random test configurations, e.g., for monitoring purposes, or on a one-off basis causes them to be executed through many instances/channels 10.1, 10.2, 10.3 in parallel, e.g., as a load test. The central system 5, however, as a rule does not execute these tests itself, but rather transmits test programs and test configurations to means 20 especially foreseen for this, here probes (computers) 11.1, 11.2, 11.3. These are in preference situated at separate locations in a network 2, e.g., at providers, in a computing centre, etc. As a rule, the transmission simultaneously takes place to several probes (schematically illustrated by arrow 13.1, 13.2, 13.3). These execute one or several tests and transmit results dependent on the location to a central system. This 25 can be the same central system of a different one. The central system 5 (or if so required also one or several probes 11.1, 11.2, 11.3) analyses and stores the results and if necessary orders further reactions (e.g., triggers an alarm). In the case of the method in accordance with the invention, a plugin (14.1, 14.2, 14.3) is caused to be executed by being transmitted through a network (2) to at least one computer (11.1, 11.2, 11.3). The plugin (14.1, 14.2, 14.3) subsequently orders the at last one computer (11.1, 11.2, 11.3) to cause the plugin (14.1, 14.2, 14.3) to be executed.

By the arrangement in accordance with the invention of one or of several central systems 5 and of one or of several probes 11.1, 11.2, 11.3 at differing (geographical) locations in the intranet or internet it can be tested, whether, e.g., a target system to be monitored/server 4 can be reached and/or is operative or whether it has certain characteristics or whether a local characteristic is present in a probe and if necessary is operative. For example, a web server is checked from several probes. In doing so, it is in particular tested, whether the web server can be reached from the individual probes, therefore from different geographical points. If the web server can be reached, then, e.g., also the „contents„ of the web servers is tested (behaviour in response to HTTP—requests). Also, if so required, a load test can be carried out. It is of essence, that the server is monitored not only from a single point, but from many points.

The described system architecture in accordance with the invention, in the case of which the operation is from several, geographically separate points, supplemented with plugins in accordance with the invention, which are executed on probes, results in a universal test system, which can carry out almost any conceivable test in an intranet, resp., in the internet, without the whole system architecture having to be reprogrammed or added to for differing tests. As a rule it is sufficient, that a new plugin in accordance with the invention is generated typically automatically by means of a recorder in accordance with the invention and stored in a data bank of one of the central systems.

What is claimed is:

1. A method to execute a plugin, comprising the steps of transmitting, from a first computer, the plugin through a network to several computers;

transmitting, from the first computer, requests for execution of the plugin through the network to the several computers;

causing the several computers to execute the plugin;

wherein the plugin caused to be executed on the several computers causes the several computers to transmit data form monitoring purposes to a further computer connected through a network, the further computer being distinct from the first computer.

2. Computer-readable medium containing computer program code, characterized in that it is suitable for causing the several computers to execute the steps of the method in accordance with claim 1.

3. A method to execute a plugin, comprising the steps of:

transmitting, from a first computer, the plugin through a network to several computers;

transmitting, from the first computer, requests for execution of the plugin through the network to the several computers;

causing the several computers to execute the plugin; wherein the plugin caused to be executed on the several computers causes the several computers to test a further computer, which is distinct from the first computer.

4. The method of claim 3, wherein the test determines whether the further computer is reachable.

5. The method of claim 3, wherein the test determines whether the further computer is operative.

6. The method of claim 3, wherein the test determines whether the further computer has certain characteristics.

7. The method of claim 3, wherein the test is a load test on the further computer.

* * * * *